July 24, 1956 A. F. KAULAKIS 2,756,188
FLUID HYDROFORMING PROCESS
Filed Aug. 28, 1953
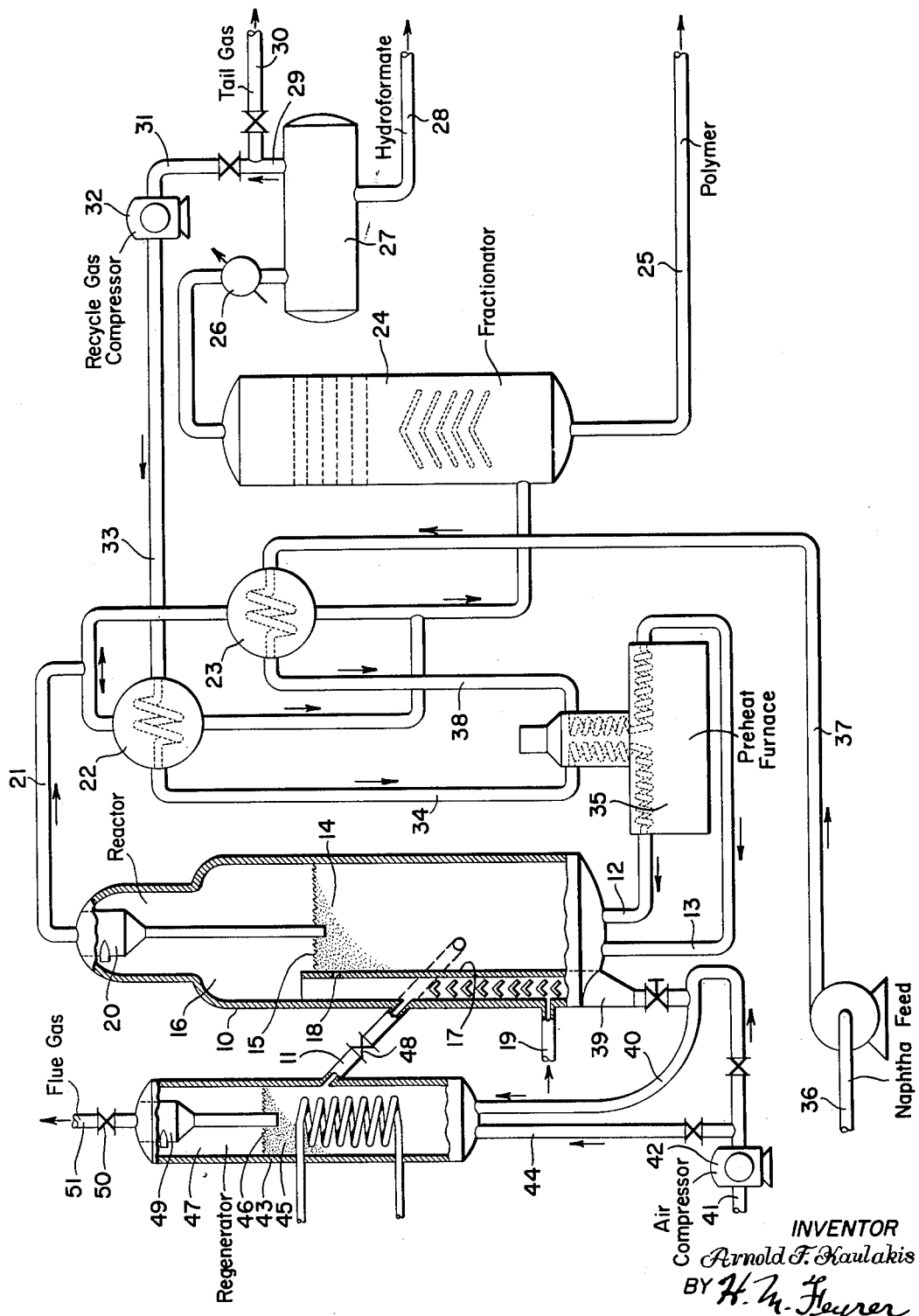
INVENTOR
Arnold F. Kaulakis
BY H. M. Heyner
ATTORNEY

United States Patent Office 2,756,188
Patented July 24, 1956

2,756,188

FLUID HYDROFORMING PROCESS

Arnold F. Kaulakis, Chatham, N. J., assignor to Esso Research and Engineering Company, a corporation of Delaware Application August 28, 1953, Serial No. 377,045

4 Claims. (Cl. 196—50)

This invention pertains to the catalytic conversion of hydrocarbon fractions and particularly to the conversion of hydrocarbon fractions boiling within the motor fuel boiling range of low knock rating into high octane number motor fuels. Specifically this invention pertains to an improved process for upgrading hydrocarbon fractions boiling within the motor fuel or naphtha range by hydroforming or aromatizing the same in a fluidized solids reactor system.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are usually carried out in the presence of hydrogen at temperatures of 780°–1150° F. in the pressure range of about 50–3000 lbs. per sq. in. and in contact with such catalysts as molybdenum oxide, chromium oxide, or in general oxides or sulfides of metals of groups IV, V, VI, VII and VIII of the periodic system of elements alone, or generally supported on a base or spacing agent such as alumina gel, precipitated alumina or zinc aluminate spinel. It has also been proposed to reform hydrocarbon fractions boiling within the motor fuel range in contact with platinum, palladium, rhodium or the like dispersed upon alumina, or a modified alumina support. A good hydroforming catalyst is one containing about 10 wt. per cent molybdenum oxide on an aluminum oxide base prepared by heat treating a hydrated aluminum oxide. A more heat stable support or spacing agent than alumina may be prepared by combining aluminum oxide with zinc oxide preferably in molecular proportions thereby forming a zinc aluminate spinel.

It has been proposed in application Serial No. 188,236, filed October 3, 1950, now Patent No. 2,689,823, to effect the hydroforming of naphtha fractions in a fluidized solids reactor system in which naphtha vapors are passed continuously through a dense, fluidized bed of hydroforming catalyst particles in a reaction zone, spent catalyst particles being continuously withdrawn from the dense bed and passed to a separate regeneration zone where inactivating carbonaceous deposits are removed whereupon the regenerated catalyst particles are returned to the main reactor vessel. In the process disclosed in said patent application, operation has been limited to low catalyst to oil ratios (around 1:1) by selectivity considerations, since higher ratios resulted in excessive carbon formation. Moreover, high regeneration temperatures have not been possible due to steam deactivation of the catalyst. These factors limited the transfer of heat from the regenerator to the reactor via the catalyst and made it necessary to provide cooling coils in the regenerator and to provide furnaces or other means for supplying heat to the reactor either directly or indirectly through the reactants and/or the hydrogen-rich recycle gas.

It is the object of this invention to provide a process whereby hydrocarbon fractions boiling within the motor fuel range may be hydroformed in an advantageous manner by the fluidized solids technique.

It is a further object of this invention to provide a process whereby hydrocarbon fractions boiling within the motor fuel range may be hydroformed in contact with a dense fluidized bed of catalyst particles at higher catalyst to oil ratios.

It is also the object of this invention to provide a process whereby hydrocarbon fractions boiling within the motor fuel boiling range may be hydroformed in contact with a dense fluidized bed of catalyst particles which catalyst particles are continuously withdrawn from the reactor bed, partially freed of carbonaceous deposits and recycled to the reactor bed.

These and other objects will appear more clearly from the detailed specification and claims which follow.

It has now been found that the hydroforming of petroleum fractions boiling within the motor fuel boiling range by the fluidized solids technique can be carried out to greater advantage if spent catalyst withdrawn from the dense fluidized catalyst bed in the reactor zone is, preferably after stripping with steam or other suitable stripping gas, introduced into a regenerator where the spent catalyst particles are retained for a sufficient period to burn off only part of the carbonaceous deposits whereupon the partially regenerated catalyst particles, still carrying from 1.0 to 4.0 wt. per cent carbon are returned directly to the reactor without contacting hydrogen or hydrogen-rich gases. The greatest advantages are realized when, in addition to operating with 1.0 to 4.0 wt. per cent of carbon on the regenerated catalyst, the amount of catalyst in the dense bed in the reactor and the catalyst circulation rate are so correlated as to maintain a catalyst to oil ratio of from about 5 to about 20, preferably from 5 to 10, with a catalyst residence time in the reactor of at least 10 minutes and preferably about 20 minutes. By this combination of expedients it is possible to avoid almost completely the oxidation and reduction of the catalytic metal oxide component, thereby reducing the amount of oxygen required for regeneration and minimizing consumption of hydrogen for the reduction or reactivation of the catalyst while at the same time achieving a substantial reduction in the amount of coke or carbon formed in the conversion thereby further reducing oxygen requirements for regeneration of the catalyst. Moreover, by operating the process at high catalyst to oil ratios, i. e. 5 to 1 and as high as 15 to 1, it is possible to carry the necessary heat of reaction into the reaction zone by means of the catalyst, thereby avoiding thermal degradation of the feed stock through preheating to excessively high temperatures and reducing the amount of recycle gas needed for supplying the endothermic heat of reaction.

The present process is applicable to the hydroforming or aromatizing of virgin naphtha, cracked naphtha, Fischer-Tropsch naphtha or the like of a broad boiling range, i. e., from about 180° F.–430° F. or it may also be applied to the treatment of a narrow boiling fraction such as a $C_6$–$C_7$ cut.

Catalysts that may be used in accordance with the present invention include the common hydroforming catalysts including platinum and palladium metals, preferably Group VI metal oxides or sulfides upon suitable supports or spacing agents. Molybdenum oxide or chromium oxide on activated alumina or upon zinc aluminate spinel are particularly suitable.

The hydroforming or aromatizing operation is effected at pressures within the range of about 50 to 500 p. s. i. g., preferably at 200–250 p. s. i. g. at temperatures of 850°–1050° F., preferably at about 900°–1000° F. The throughput of naphtha or fresh feed should be between 0.2 to 2.0 w./hr./w., preferably 0.5–1.0 w./hr./w., with recycle gas of 40–80 per cent hydrogen content used at the rate of 2000–4000 cu. ft. per barrel of fresh feed. The recycle gas should be preheated to temperatures of between about 1000° and 1200° F. The catalyst to oil ratio should be between 5 and 15 and is preferably between 5 and 10. The regeneration temperature should be between about 1050° and 1175° F.

The catalyst should be retained in the reactor vessel at least about 10 minutes and preferably about 20 minutes. In some cases it may be desirable to have a catalyst residence time in the reactor as high as one to two hours. The average residence time of the catalyst in the regenerator is less than 15 minutes and preferably less than about 5 minutes.

Reference is made to the accompanying drawing illustrating a diagrammatic flow plan of the process in accordance with the present invention.

In the drawing, 10 is a reactor vessel provided with an inlet line 11 for the supply of solid catalyst particles, an inlet line 12 for hydrogen-rich recycle gas and a separate inlet line 13 for the introduction of fresh naphtha feed. A horizontal, perforated plate or grid may be arranged near the bottom of vessel 10 for distributing the incoming recycle gas and naphtha vapors uniformly over the entire cross section of the vessel. Alternatively, the inlet lines may be connected to other distributing means such as nozzles, rings or the like in order to insure uniform distribution of the incoming reactants over the entire cross section of the reactor vessel. A charge or bed of finely divided hydroforming catalyst particles is established in the lower portion of reactor vessel 10. Suitable catalysts include platinum and palladium metals and group VI metal oxides, such as molybdenum, chromium or tungsten oxide or mixtures thereof alone or preferably upon a support or carrier such as activated alumina, zinc aluminate spinel or the like. Other suitable catalysts or carriers may be used. The catalyst particles are, for the most part, between 200 and 400 mesh in size or about 0–200 microns in diameter with a major proportion between 20 and 80 microns. The catalyst particles are supplied to the reactor through line 11. In starting up the process for the first time, the hydrogen-containing gas may be supplied from an extraneous source. The process, however, normally evolves hydrogen which is advantageously recycled to the reactor. The naphtha and the recycle or hydrogen-containing gas are passed as a mixture up through the reaction zone at a superficial velocity of about 0.2 to 1.0 ft. per second at reactor conditions depending upon the pressure. For example, the velocity should be below about 0.6 feet per second in the pressure range of 200–250 lbs. per sq. inch. The velocity should be sufficient to maintain a dense, turbulent, liquid simulating bed 14 of solids and gas having a definite level 15 with a dilute phase suspension 16 of catalyst solids in gas thereabove. Lower linear gas velocities are used for higher pressures to obtain dense, fluidized beds. If desired, the reactor vessel 10 may be provided with horizontally arranged perforated baffles spaced vertically therein or vertically arranged and spaced baffles to improve the contacting of the hydrocarbon vapors with the catalyst.

A vertical internal conduit 17 is provided in the reactor 10 for the withdrawal of catalyst directly from the dense bed 14. The upper end of the conduit 17 extends above the level 15 of the dense bed and has openings or ports 18 at one or more points along its length to permit flow of catalyst from the dense bed into the conduit. The port 18 should be located well up in the dense bed 14 but the port should be a sufficient distance below the level 15 to take care of any normal fluctuations in the level of the bed. More than one orifice or port 18 may be provided at different levels in conduit 17 and each port may be provided with valves or control means to regulate the withdrawal of catalyst from the dense bed 14.

Steam or an inert gas such as nitrogen, flue gas or the like or mixtures thereof are supplied to conduit 17 through line 19 near the base of conduit 17 to displace, strip off or desorb hydrogen, hydrocarbon reactants or reaction products flowing into conduit 17 with the catalyst particles, the stripping gas passing upwardly through conduit 17 countercurrent to the downflowing catalyst. The superficial velocity of the stripping gas should be equal to or higher than the superficial velocity of the vapors and gases passing upwardly through reactor 10.

The stripping gas and stripped out constituents are discharged from the top of conduit 17 into the dilute phase 16 and are combined with the reaction product vapors leaving the dense bed 14 and the resultant mixture is then passed through one or more cyclone separators 20 or the like to remove entrained catalyst particles and then withdrawn through line 21 to suitable heat and product recovery equipment. In the flow plan illustrated, part of the reaction products are passed through cooler 22 in indirect heat exchange with recycle gas while the remainder of the reaction products is passed through cooler 23 in indirect heat exchange with fresh naphtha feed. The partially cooled reaction products are discharged into fractionator 24 wherein they are freed of polymer or a high boiling fraction which is removed through line 25. A small amount of catalyst may be present in the polymer stream and can be recovered by filtration or centrifuging and recycled to the reactor system. The product vapors and diluent gases are taken overhead from the fractionator, condensed in cooler 26 and discharged into separator 27. Hydroformate is withdrawn from separator 27 through line 28 and is passed to suitable rerun, stabilizing and/or storage equipment. Gaseous products are withdrawn from separator 27 through line 29, excess or tail gas being discharged from the system through line 30 while the remainder is recycled in the system. The recycle gas is passed via line 31 to compressor 32 and thence via line 33 to heat exchanger 22 where the gas is partially heated by indirect heat exchange with hot reaction products and thence via line 24 to preheat furnace 35 where it is heated to the desired temperature (1100–1200° F.) and is then discharged into the reactor via inlet line 12. Fresh naphtha feed supplied through line 36 is pumped through line 37 to heat exchanger 23 where it is passed in indirect heat exchange relation to hot reaction products. The partially heated feed naphtha is then passed via line 38 to preheat furnace 35 where it is preheated to reaction temperature or temperature slightly above reaction temperature whereupon the preheated naphtha vapors are supplied through inlet line 13 to the reactor vessel 10.

Stripping the catalyst particles during withdrawal from the reactor vessel through conduit 17 decreases the amount of combustible material that must be burned during the regeneration of the catalyst. If desired, a separate external stripping vessel may be used for the stripping step with the stripping gas and stripped out material leaving the stripper being conducted to the dilute phase 16 in the reactor and thence to outlet line 21 or to separate recovery means. The lower end of conduit 17 is connected to standpipe 39 having a smaller diameter than conduit 17. This standpipe serves to develop additional pressure necessary to overcome the pressure drop through the regeneration system. Under elevated pressure conditions obtaining in the reaction system, the catalyst flowing from the stripping section 17 into the standpipe section 39 will carry entrained or trapped gas with it in an amount sufficient to maintain it in freely flowing fluid condition and this condition should be maintained during passage of the catalyst through the standpipe. If necessary, some additional gas may be added at one or more spaced points on the standpipe 39. Moreover, as the process is ordinarily carried out under pressures of about 100 lbs. per sq. inch or higher, and is much higher than the pressure drop through the regeneration system, the amount of pressure build up by the standpipe is relatively small compared to the pressure in the process, consequently there is less compression of the gas entering the top of standpipe 39 as the solid catalyst particles move down therein so that in most cases there is no need for adding additional aeration gas to standpipe 39. This is particularly true if the rate of downflow of solids in standpipe 39 is relatively high so as to prevent catalyst from being deaerated. By making the diameter of the standpipe 39 relatively small as compared with the stripping section 17, the velocity of the solids through the standpipe section will be increased thus reducing the tendency to deaerate the catalyst. A slide valve or the like is provided near the base of the standpipe to control the rate of withdrawal of stripped catalyst from the standpipe.

Catalyst is discharged from the base of standpipe 39 into transfer line or conduit 40 wherein the catalyst particles are picked up by a stream of air or other carrier gas supplied through inlet line 41 and compressor 42 and conveyed through suitable distributing means into regenerator 43, where carbonaceous deposits are removed to a certain extent from the catalyst particles. Since the rate of burning of the carbonaceous deposits from hydroforming catalysts is very high and tends to cause overheating of the catalyst particles, it is advisable to utilize only a portion of the regeneration air to convey the spent catalyst through conduit 40 and to introduce the air necessary for regeneration directly into the regenerator through line 44. If desired, an inert gas such as nitrogen or flue gas can be used as carrier gas to convey the spent catalyst into the regenerator in which event all of the air necessary for regeneration is supplied directly to the regenerator.

The velocity of the gas passing upwardly through the regenerator 43 is controlled to maintain a lower dense, highly turbulent, fluidized bed 45 of catalyst and gas having a definite level 46 and superposed by a dilute dispersion 47 of catalyst particles in regeneration gas. To accomplish this, the superficial velocity of the regenerating gas in regenerator 43 may range from 0.3 to 1.5 ft. per second depending upon the pressure, for example, below 1.0 ft. per second at a regeneration pressure of about 200–250 lbs. per sq. inch. Conduit 11 is attached to the regenerator 43 for the withdrawal of regenerated catalyst particles directly from the dense fluidized bed 45. While the conduit is shown as connected directly to the wall of the regenerator vessel, an internal or external stripper may be provided to permit stripping of regeneration gases from the regenerated catalyst prior to their discharge into the reactor vessel. Also, if desired, stripping and/or fluidizing gas, preferably nitrogen or scrubbed flue gas, may be introduced into transfer line 11. It is essential that the gas introduced into conduit 11 be free of hydrogen and/or hydrocarbons which could decompose to yield hydrogen. The regenerated catalyst passes through conduit 11 at a rate controlled by slide valve 48 and is discharged directly into dense bed 14 in the reactor 10 for intermixing with the mass of equilibrium catalyst within the reactor vessel 10.

Regeneration of the catalyst in regenerator 43 is controlled to retain substantial amounts of carbonaceous materials upon the regenerated catalyst particles. Specifically the regeneration should be so conducted that the regenerated catalyst contains from 1.0 to 4.0 per cent of carbon preferably from 1 to 2 wt. per cent on the catalyst. At carbon contents of this order, it is possible not only to prevent or minimize oxidation of the catalytic metal component but it is also possible to control catalyst activity and selectivity and thereby permit fluid hydroforming operation at catalyst circulation rates compatible with heat balance requirements and at the same time obtain improved yield-octane relationships. It is also possible in this way to avoid the use of excess air for regeneration which is particularly advantageous since additional compressor capacity would be necessary to bring the excess air up to regeneration pressure. The avoidance of the oxidation of the catalytic metal component is also of advantage in minimizing or avoiding the reduction of the regenerated catalyst and consequent hydrogen consumption within the reactor vessel.

Regeneration gases are taken overhead from regenerator 43 through one or more cyclone separators 49 which remove entrained catalyst. The gases then pass through a pressure reducing valve 50 to stack or flue 51. Catalyst inventory in the system can be decreased by withdrawing equilibrium reactor catalyst or preferably regenerated catalyst through a cooler and thence through pressure reducing means to a storage hopper. Catalyst inventory in the system may be increased by conveying catalyst from the storage hopper into the reactor system in various ways. For example, a high pressure gaseous stream can be used to convey catalyst into the reactor or regenerator or preferably, catalyst can be transferred from the storage hopper into a tank where it is formed into a pumpable slurry with feed naphtha whereupon the slurry is pumped through suitable control valves to distributor nozzles in the reactor.

The following table summarizes data obtained in the fluid hydroforming of a heavy (200°/430° F.) virgin naphtha stock at 300 lbs. per sq. inch at 900° F. in contact with a molybdenum oxide on alumina catalyst in a conventional operation with small amounts of carbon left on regenerated catalyst using a low catalyst to oil ratio as previously indicated and at a high catalyst to oil ratio with low carbon on regenerated catalyst and an operation carried out to form a hydroformate of essentially the same characteristics but in which larger amounts of carbon are retained upon the regenerated catalyst.

*Table*

| | 1–2 | 10 | 10–18 | 10–18 |
|---|---|---|---|---|
| Catalyst/Oil Ratio | 1–2 | 10 | 10–18 | 10–18 |
| Carbon on Reg. Catalyst | 0–0.7 | 0–0.7 | 1.5–2.0 | [1] 1.5–2.0 |
| CRF-R of C₄–430° F | 98.0 | 98.0 | 98.0 | 98.0 |
| Carbon, Wt. Percent FF | 0.6 | 2.8–4.0 | 0.6 | 0.8 |
| Dry Gas, Wt. Percent FF | 16.4 | 13.5–12.3 | 16.4 | 14.0 |
| C₄–430° F., Wt. Percent FF | 83.0 | 83.7 | 83.0 | 85.2 |

[1] Regenerated catalyst discharged into reactor without contact with hydrogen-containing gas.

It may readily be seen from this table that when a catalyst to oil ratio of 10 was used with small quantities of carbon on the regenerated catalyst, carbon formation was more than quadrupled. The use of high catalyst to oil ratios does not, however, produce an increase in carbon formation when larger amounts of carbon (1.5 to 2.0 wt. per cent) are retained on the regenerated catalyst. The use of higher catalyst to oil ratios with large amounts of carbon on the regenerated catalyst facilitates the transfer of heat from the regeneration zone to the reaction zone. The direct return of the partially regenerated catalyst to the reaction zone gives slightly higher carbon formation and less dry gas with more than 2 wt. per cent yield advantage of C₄—430° F. product.

This application is a continuation-in-part of application Serial No. 234,026, filed June 28, 1951, by Arnold F. Kaulakis and Louie Randall Scharmann, executrix of Walter G. Scharmann (deceased).

The foregoing description contains a limited number of embodiments of the present invention. It will be understood, however, that numerous variations are possible without departing from the scope of the following claims.

What is claimed is:

1. A method of catalytically converting a hydrocarbon fraction boiling within the motor fuel boiling range which comprises passing naphtha vapor in admixture with hydrogen-rich gas through a dense, fluidized bed of finely divided hydroforming catalyst in a reaction zone at temperatures of 850°–1050° F. and at pressures of 100–500 lbs. per sq. inch at a catalyst to oil ratio of 5 to 20 and at a throughput of 0.2 to 2.0 w./hr./w., withdrawing a stream of reaction products substantially free of catalyst particles overhead from the reaction zone, withdrawing a stream of catalyst particles directly from the dense fluidized bed in said reaction zone, stripping adsorbed hydrogen and hydrocarbon material from the withdrawn catalyst, regenerating the stripped catalyst particles by burning off at most only a part of the carbonaceous deposit from the catalyst particles, withdrawing a stream of regenerated catalyst particles containing from 1.0 to 4.0 wt. per cent of carbon from the regeneration zone and without contacting the regenerated catalyst particles containing these amounts of carbon with hydrogen-containing gas, discharging these regenerated catalyst particles directly into the dense, fluidized bed of catalyst particles in the reaction zone.

2. A method of catalytically converting a hydrocarbon fraction boiling within the motor fuel boiling range which comprises passing naphtha vapors in admixture with hydrogen-rich gas through a dense, fluidized bed of finely divided hydroforming catalyst in a reaction zone at temperatures of 900°–1000° F. and at pressures of 200–250 lbs. per sq. inch at a catalyst to oil ratio of 5 to 10 and at a throughput of 0.5 to 1.0 w./hr./w., withdrawing a stream of reaction products substantially free of catalyst particles overhead from the reaction zone, withdrawing a stream of catalyst particles directly from the dense fluidized bed in said reaction zone, stripping adsorbed hydrogen and hydrocarbon material from the withdrawn catalyst, regenerating the stripped catalyst particles by burning off at most only a part of the carbonaceous deposit from the catalyst particles, withdrawing a stream of regenerated catalyst particles containing from 1.5 to 2.0 wt. per cent of carbon from the regeneration zone and without contacting the regenerated catalyst particles containing these amounts of carbon with hydrogen-containing gas, discharging these regenerated catalyst particles directly into the dense, fluidized bed of catalyst particles in the reaction zone.

3. The method as defined in claim 1 wherein the catalyst comprises molybdenum oxide upon a spacing agent.

4. The method as defined in claim 2 wherein the catalyst comprises molybdenum oxide upon a spacing agent.

References Cited in the file of this patent

UNITED STATES PATENTS

| | | |
|---|---|---|
| 2,253,486 | Belchetz | Aug. 19, 1941 |
| 2,394,710 | McAfee | Feb. 12, 1946 |
| 2,414,002 | Thomas | Jan. 7, 1947 |